US007606572B2

(12) United States Patent
Rhee et al.

(10) Patent No.: US 7,606,572 B2
(45) Date of Patent: Oct. 20, 2009

(54) PROTOCOL FOR CONFIGURING A WIRELESS NETWORK

(75) Inventors: Sokwoo Rhee, Lexington, MA (US); Sheng Liu, Cambridge, MA (US)

(73) Assignee: Millennial Net, Inc., Burlington, MA (US)

( * ) Notice: Subject to any disclaimer, the term of this patent is extended or adjusted under 35 U.S.C. 154(b) by 0 days.

(21) Appl. No.: 11/932,158

(22) Filed: Oct. 31, 2007

(65) Prior Publication Data

US 2008/0062941 A1    Mar. 13, 2008

Related U.S. Application Data

(62) Division of application No. 10/860,935, filed on Jun. 4, 2004, now Pat. No. 7,313,399.

(60) Provisional application No. 60/475,949, filed on Jun. 5, 2003.

(51) Int. Cl.
*H04W 40/00* (2006.01)

(52) U.S. Cl. .................. 455/445; 455/450; 455/453; 455/432.1

(58) Field of Classification Search ............ 455/445, 455/450, 453, 432.1
See application file for complete search history.

(56) References Cited

U.S. PATENT DOCUMENTS

| | | | |
|---|---|---|---|
| 4,358,823 A | 11/1982 | McDonald et al. | |
| 5,128,928 A | 7/1992 | Wilder et al. | |
| 5,194,860 A | 3/1993 | Jones et al. | |
| 5,239,682 A | * 8/1993 | Strawcynski et al. | ........ 455/436 |
| 5,257,372 A | 10/1993 | Furtney et al. | |
| 5,355,371 A | 10/1994 | Auerbach et al. | |
| 5,428,636 A | 6/1995 | Meier | |
| 5,491,787 A | 2/1996 | Hashemi | |
| 5,497,368 A | 3/1996 | Reijnierse et al. | |
| 5,608,721 A | 3/1997 | Natarajan et al. | |
| 5,654,959 A | 8/1997 | Baker et al. | |
| 5,719,861 A | 2/1998 | Okanoue | |

(Continued)

FOREIGN PATENT DOCUMENTS

EP        0 650 279        4/1995

(Continued)

OTHER PUBLICATIONS

Goldsmith, A. et al., "Design Challenges for Energy-Constrained Ad Hoc Wireless Networks", IEEE Wireless Communications, pp. 8-27 (Aug. 2002).

(Continued)

*Primary Examiner*—Joseph H Feild
*Assistant Examiner*—Huy D Nguyen
(74) *Attorney, Agent, or Firm*—Joseph M. Maraia; Foley & Lardner LLP

(57) ABSTRACT

A target device joins a wireless network by attempting to locate an existing routing device in a predefined neighborhood of the wireless network, designating the existing routing device as a master routing device if the existing routing device is located in the predefined neighborhood, where the master routing device is a primary recipient of data from the target device, and attempting to locate endpoint devices in the predefined neighborhood if the existing routing device is not located in the predefined neighborhood.

18 Claims, 7 Drawing Sheets

U.S. PATENT DOCUMENTS

| | | | |
|---|---|---|---|
| 5,729,680 | A | 3/1998 | Belanger et al. |
| 5,790,817 | A | 8/1998 | Asghar et al. |
| 5,809,222 | A | 9/1998 | Kizu |
| 5,815,692 | A | 9/1998 | McDermott |
| 5,854,994 | A | 12/1998 | Canada et al. |
| 6,028,857 | A | 2/2000 | Poor |
| 6,058,106 | A | 5/2000 | Cudak et al. |
| 6,088,591 | A * | 7/2000 | Trompower et al. ......... 455/438 |
| 6,192,230 | B1 | 2/2001 | van Bokhorst et al. |
| 6,208,247 | B1 | 3/2001 | Agre et al. |
| 6,272,537 | B1 | 8/2001 | Kekic et al. |
| 6,275,477 | B1 | 8/2001 | Trompower et al. |
| 6,285,892 | B1 | 9/2001 | Hulyalkar |
| 6,330,250 | B1 | 12/2001 | Curry et al. |
| 6,381,250 | B1 | 4/2002 | Jacobson et al. |
| 6,414,955 | B1 | 7/2002 | Clare et al. |
| 6,415,330 | B1 | 7/2002 | Okanoue |
| 6,426,959 | B1 | 7/2002 | Jacobson et al. |
| 6,427,066 | B1 | 7/2002 | Grube |
| 6,437,692 | B1 | 8/2002 | Petite et al. |
| 6,502,206 | B1 | 12/2002 | Kosuge et al. |
| 6,804,790 | B2 | 10/2004 | Rhee |
| 6,961,310 | B2 * | 11/2005 | Cain ......................... 370/238 |
| 7,123,908 | B2 * | 10/2006 | Chandler .................... 455/428 |
| 2001/0003191 | A1 | 6/2001 | Kovacs et al. |
| 2001/0019956 | A1 * | 9/2001 | Tada ........................ 455/434 |
| 2002/0012320 | A1 | 1/2002 | Ogier et al. |
| 2002/0018448 | A1 | 2/2002 | Amis et al. |
| 2002/0027894 | A1 | 3/2002 | Arrakoski et al. |
| 2002/0036987 | A1 | 3/2002 | Garcia-Luna-Aceves et al. |
| 2002/0059434 | A1 | 5/2002 | Karaoguz et al. |
| 2002/0061001 | A1 | 5/2002 | Garcia-Luna-Aceves et al. |
| 2002/0061009 | A1 | 5/2002 | Sorensen |
| 2002/0067736 | A1 | 6/2002 | Garcia-Luna-Aceves et al. |
| 2002/0075941 | A1 | 6/2002 | Souissi et al. |
| 2002/0080768 | A1 | 6/2002 | Garcia-Luna-Aceves et al. |
| 2002/0085503 | A1 | 7/2002 | Hulyalkar et al. |
| 2002/0085526 | A1 | 7/2002 | Belcea |
| 2002/0089945 | A1 | 7/2002 | Belcea |
| 2002/0090979 | A1 | 7/2002 | Sydor |
| 2002/0101869 | A1 | 8/2002 | Garcia-Luna-Aceves et al. |
| 2002/0110105 | A1 | 8/2002 | Awater et al. |
| 2002/0150075 | A1 | 10/2002 | Belcea |
| 2002/0167960 | A1 | 11/2002 | Garcia-Luna-Aceves et al. |
| 2003/0091011 | A1 * | 5/2003 | Roberts et al. ............... 370/338 |
| 2004/0029553 | A1 * | 2/2004 | Cain ......................... 455/403 |
| 2004/0203936 | A1 | 10/2004 | Ogino et al. ................ 455/463 |

FOREIGN PATENT DOCUMENTS

| | | |
|---|---|---|
| EP | 0 907 262 | 4/1999 |
| JP | 57089169 | 6/1982 |
| WO | WO 00/62429 | 10/2000 |
| WO | WO 02/39242 | 5/2002 |

OTHER PUBLICATIONS

Greenberg, A. et al., "Design and Analysis of Master/Slave Multiprocessors", IEEE Transactions on Computers, 40(8):963-976 (1991).

Hull, B. et al., "Poster Abstract: Bandwidth Management in Wireless Sensor Networks", ACM (SenSys'03), pp. 306-307 (2003).

Johnson et al., "Dynamic Source Routing in Ad Hoc Wireless Networks" Mobile Computing, Kluwer Academic Publishers, 18 pgs. (1996).

Park et al., "A Highly Adaptive Distributed Routing Algorithm for Mobile Wireless Networks", IEEE, 9 pgs. (1997).

Perkins, C. et al., "Ad-Hoc On-Demand Distance Vector Routing", Proceedings of the 2nd IEEE Workshop on Mobile Computing Systems and Applications, pp. 90-100 (1999).

Poor, R., "Gradient Routing in Ad Hoc Networks", MIT Media Laboratory (2000).

Royer et al., "A Review of Current Routing protocols for Ad Hoc Mobile Wireless Networks", IEEE Personal Communications, pp. 46-55 (1999).

Woo et al., "A Transmission Control Scheme for Media Access in Sensor Networks", Mobicom2001, pp. 221-235 (2001).

Gerla et al., "Landmark Routing for Large Ad Hoc Wireless Networks", Global Telecom. Conf., IEEE v.3, pp. 1702-1706 (2000).

International Search Report for Application No. PCT/US04/17894, dated Jan. 19, 2005.

Written Opinion for Application No. PCT/US2004/017894 Mailed Jan. 19, 2005.

* cited by examiner

PROTOCOL FOR CONFIGURING A WIRELESS NETWORK

CROSS-REFERENCE TO RELATED APPLICATION

This application claims the benefit of U.S. Provisional Application No. 60/475,949, filed Jun 5, 2003 and entitled "Protocol For Configuring A Wireless Network", the contents of which are incorporated herein by reference as if set forth in full. This application is a divisional application of U.S. application Ser. No. 10/860,935, filed on Jun. 4, 2004 now U.S. Pat. No. 7,313,399 and entitled "Protocol For Configuring A Wirelesss Network", the contents of which are incorporated herein by reference as if set forth in full.

TECHNICAL FIELD

This application is directed to a network protocol for configuring an ad-hoc, self-organizing wireless network.

BACKGROUND

In a self-organizing wireless network, network nodes (e.g., devices on the network) cooperate to form routes and deliver data packets generated by the nodes to the packets' intended destinations. When the physical distance between the source of a data packet and its destination is longer than the radio transmission range of nodes corresponding to the source and destination, delivery of the packet will require one or more relays (i.e., hops) between the source and destination nodes.

It is well known that a homogeneous network with a flat structure is highly self-configurable in the sense that nodes can be randomly deployed in a given space without following any hierarchy. Without a hierarchy, every node in a homogeneous network relies on its neighboring nodes within a wireless transmission range to forward outgoing data packets and to deliver incoming data packets.

Whenever a node of a homogeneous network is not a data originator, the node prepares to function as a router and actively listens to a communication channel so that it can capture data transmitted by its neighboring nodes and forward the data along a path to the data's destination (if the node itself is not the destination). All nodes in a homogeneous network continuously operate in either a "transmit" mode or a "receive" mode, rarely going into a power-saving "sleep" mode. As a result, power efficiency in a homogeneous network is often limited, since all nodes in the network are constantly activated in the receive mode, even when the communication channel is quiet.

In contrast to a homogeneous network, a heterogeneous network has a well-defined, rigid hierarchy, which explicitly specifies the function of every node in the network. Only certain nodes in a heterogeneous network that have sufficient power resources can operate with a high duty cycle and, therefore, provide routing capabilities.

Nodes with limited power sources, such as batteries, can operate with a much lower duty cycle, since they do not need to provide routing functions. When such nodes only acquire data from devices that they are connected to, and serve as data originators in the network, such nodes represent endpoint devices in the network hierarchy. These endpoint devices become activated only when they originate data, which occurs on a periodic or event-driven basis. Since such nodes do not have routing responsibilities, they go into a power-saving (e.g., low-power) mode when not transmitting or receiving data.

Thus, it is evident that a heterogeneous network allows endpoint devices to operate with a power efficiency that is much higher than the power efficiency of uniform nodes in a homogeneous network. In most heterogeneous networks, all data is directed toward one or a few nodes designated as base stations. In a heterogeneous network, base stations are pinnacles of the hierarchy. All other nodes are members of the network with a certain rank in the hierarchy. A device's rank depends on various factors, such as relative distance from the base stations, power resources, and radio link reliability.

One drawback of a conventional heterogeneous network is that every member node has a limited and defined role in the hierarchy. Without the capability of adapting router distribution to changing conditions, such a network will not be able to handle changing conditions effectively. For instance, when traffic is relatively low, the network can be overly populated with routers that operate with an unnecessarily high duty cycle, leading to relatively low power efficiency.

SUMMARY

In general, in one aspect, this application is directed to ways for a target device to join a wireless network. The target device attempts to locate an existing routing device in a predefined neighborhood of the wireless network, designates the existing routing device as a master routing device if the existing routing device is located in the predefined neighborhood, where the master routing device is a primary recipient of data from the target device, and attempts to locate endpoint devices in the predefined neighborhood if the existing routing device is not located in the predefined neighborhood. This aspect may include one or more of the following features in any combination.

The target device may designate the existing routing device as the master routing device if the existing routing device meets at least one of plural predefined criteria. The plural predefined criteria may include a distance from the existing routing device to a base station on the wireless network, a quality of a communication link associated with the existing routing device, and a battery capacity of the existing routing device.

If the master routing device becomes unreliable or congested, the target device may search the wireless network for a new master routing device. This searching may include broadcasting a routing device election request, receiving identities of other devices on the wireless network in response to the routing device election request, and designating one of the other devices on the wireless network to be a new master routing device based on one or more predefined criteria. The target device may operate as a routing device if the target device is a sole routing device for at least one other device on the network. If the target device does not receive a communication from another device on the wireless network within a predetermined time, the target device ceases operation as a routing device and operates as an endpoint device on the wireless network.

The target device may operate as a routing device, and may discontinue operating as a routing device if the target device is not a sole routing device for the other devices on the network. The target device may operate as an endpoint device of the network after the target device discontinues operation as a routing device. Operation as an endpoint device may include entering a low-power mode at least once during operation.

The predefined neighborhood may be a radio frequency range of the target device. Attempting to locate endpoint devices in the predefined neighborhood may include listening for a data transmission from an endpoint device, determining whether the endpoint device is connected to the wireless network based on the data transmission, and requesting that the endpoint device act as a router for the target device. The target device may designate the endpoint device as a master device for the target device if the endpoint device agrees to act as a router for the target device.

In general, in one aspect, this application is directed ways to reconfigure a base station on a wireless network, where the base station is connected to a host computer via a wired connection. The base station detects an amount of traffic directed to the base station from other devices on the wireless network, determines whether the base station has at least one connection to the wireless network that is not via the wired connection, and configures the base station to act as an intermediary device on the network if the amount of traffic is below a predetermined amount and the base station has at least one connection to the wireless network that is not via the wired connection. This aspect may include one or more of the following features in any combination.

Determining whether the base station has at least one connection to the wireless network may include sending a data packet to a target device on the wireless network, and receiving a response to the data packet. Configuring the base station to act as an intermediary device may include programming the base station not to transmit data packets to the host via the wireless connection. The base station may be configured to act as an intermediary device in a first logical network but not in a second logical network.

The base station may check the amount of traffic directed to the base station from other devices on the wireless network, and determine whether to reconfigure the base station to act as a base station if the amount of traffic exceeds a predetermined amount. If the base station is not configured to act as an intermediary device, the base station synchronizes its database with databases of other base stations on the wireless network.

In general, in one aspect, this application is directed ways for a base station to send a data packet to an endpoint device of a wireless network. The base station instructs the endpoint device to configure itself as a second base station, generates a data packet that includes an address of the second base station, and sends the data packet to the second base station via the wireless network.

Other features and advantages will become apparent from the following description, including the claims and drawings.

DESCRIPTION OF THE DRAWINGS

Like reference numerals in different figures indicate like elements.

DESCRIPTION

Figure 1:
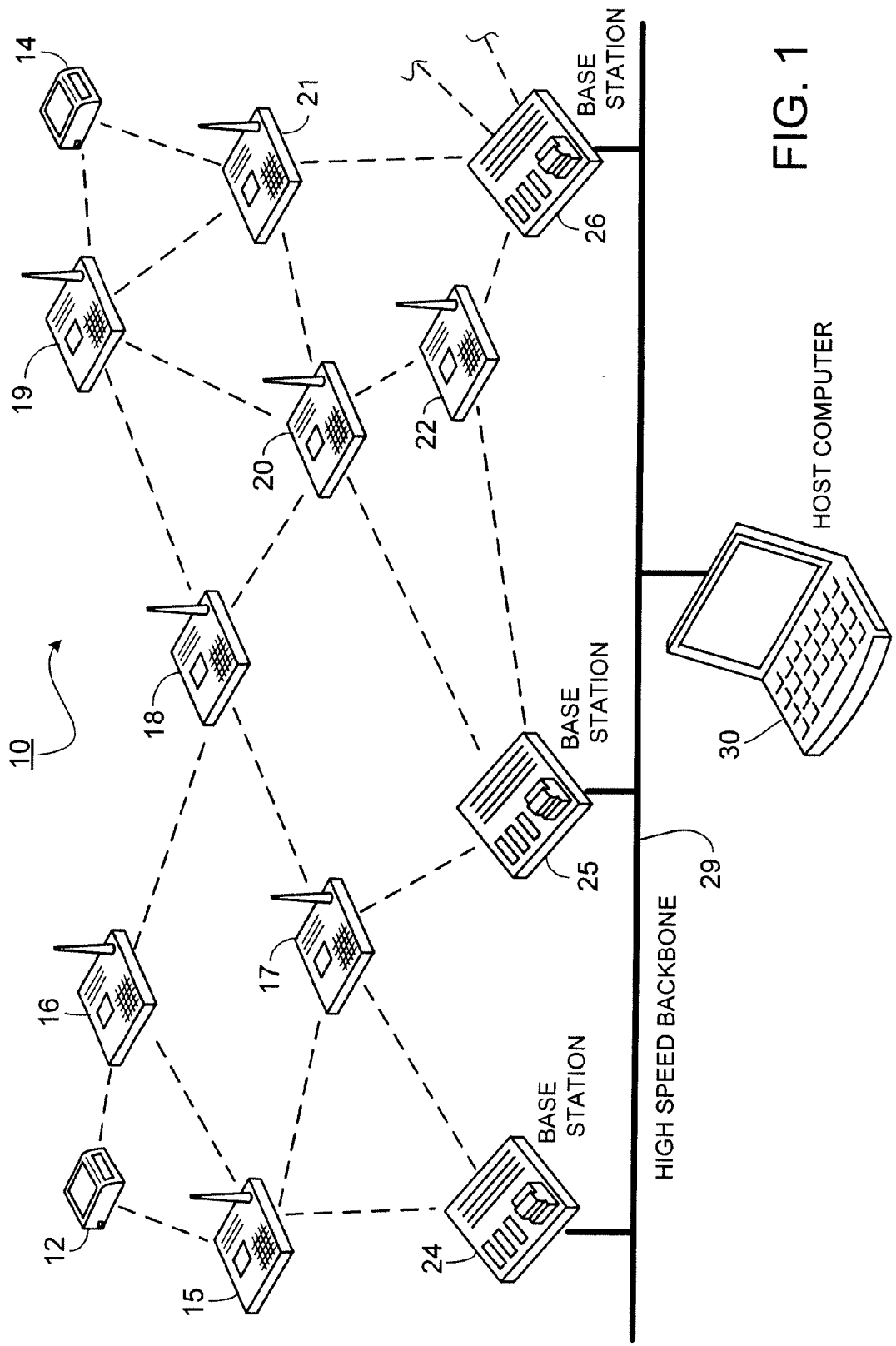
FIG. 1 is a block diagram of a wireless network on which the wireless protocol described herein may be implemented.

Described herein is a protocol for use by devices in an ad-hoc wireless network. FIG. 1 shows an exemplary wireless network 10 on which the protocol (hereafter, "the wireless protocol") may be implemented. According to the wireless protocol, a device on network 10 operates as a router in the network if there are no existing routers in a predefined neighborhood of the network or if existing routers in the predefined neighborhood cannot satisfy one or more predefined criteria.

Wireless network 10 is a heterogeneous network, since devices on wireless network 10 need not perform the same functions. Wireless network 10 includes endpoint devices 12 and 14, intermediary devices 15 to 22, and base stations 24 to 26. Endpoint devices 12 and 14 and intermediary devices 15 to 22 may communicate via radio frequency (RF) links. RF links are shown as dotted lines in FIG. 1. Base stations 24 to 26 may communicate to the intermediary devices via RF links and are wired to a high-speed backbone 29, through which base stations 24 to 26 communicate with a host computer 30 at a relatively high speed. High-speed backbone 29 may be any type of wired medium, such as Ethernet.

Each of endpoint devices 12 and 14, intermediary devices 15 to 22, and base stations 24 to 26 defines a node of wireless network 10. Each of these devices includes a memory (not shown) that stores executable instructions and one or more processors (the one or more processors defining a processing system - not shown) for executing the instructions to perform the functions described herein. In this embodiment, the structure of endpoint devices 12 and 14 may be the same as the structure of intermediary devices 15 to 22, and the structure each base station 24 to 26 is the same. This may not be the case in other embodiments. Each such device is programmed with appropriate functionality.

The base stations, intermediary devices, and endpoint devices may be any type of computing device, such as a work station, a personal computer, a server, a portable computing device, or any other type of intelligent device capable of executing instructions and connecting to a network. The base stations, intermediary devices, and endpoint devices can execute any number of computer programs, including applications that are configured to generate, receive, and transmit data packets for use on a network.

As described below, in accordance with the wireless protocol, a device entering network 10 may configure itself to operate as an intermediary device (e.g., a router or repeater) if necessary based on predefined criteria. Such a device may also have the capabilities (and configuration) of an endpoint device described below.

An endpoint device may be either a source or a destination of network data. In this embodiment, one or more sensing devices may be connected to an endpoint device; other embodiments may include endpoint devices without sensing devices. The sensing device(s) may be used to monitor physical systems, such as a processing plant, and variables, such as temperature. An endpoint device may acquire analog or digital signals from the sensing device(s) and transmit these signals to a base station through wireless network 10. An antenna (not shown) may be included on each endpoint device to effect transmission. Antennas may also be included on the other wireless devices in the network.

One or more actuators may also be connected to an endpoint device in this embodiment. The endpoint device may use analog or digital command signals to command the actuator(s). These command signals may originate in the endpoint device or in a host computer 30. In the latter case, such command signals may be transmitted from host computer 30, to a base station, and then to the endpoint device, either directly or through one or more intermediary devices in wireless network 10.

An intermediary device is an intermediate node of wireless network 10 that functions as a router or repeater to forward data sent by endpoint devices, other intermediary devices, and/or base stations. Intermediary devices typically send the data in the format that the data is received and at the same rate as the data is received. Each endpoint device, described above, may configure itself to operate as an intermediary device, and vice versa. Intermediary devices also store routing information, such as a next hop along a network path to a data packet's intended destination, and a hop on a return path.

A base station is a node of the wireless network that may be connected to high-speed backbone 29. Base stations act as intermediaries between wireless network 10 and backbone 29, performing any necessary data and protocol conversions to permit data exchange between the two. Base stations that do not connect to backbone 29 may also be integrated into network 10. Such base stations (not shown in FIG. 1) may interface to a host device, and may be connected to other host devices or to the backbone via a wireless link through, e.g., a Wi-Fi connection (described below).

Host computer 30 may also connect to high-speed backbone 29. Host computer 30 supervises wireless network 10 and performs tasks that include receiving, processing and storing data generated by endpoint devices, and issuing command signals to the endpoint devices. Host computer 30 may also be used to reconfigure an endpoint device and/or intermediary devices to implement the wireless protocol.

The only requirement in forming ad hoc wireless network 10 is that every endpoint device should be within the RF transmission range of a base station or an intermediary device, and every intermediary device should be within the RF transmission range of a base station or another intermediary device. Devices outside of their RF transmission range are typically not able to talk to each other over wireless network 10.

The overall topology of wireless network 10 resembles a spanning forest, in which the endpoint devices function as leaves, the intermediary devices function as branches, and the base stations function as roots. Like in a dense forest where trees can overlap, communication links among intermediary devices mesh to form a web-like structure, which enables the endpoint devices (leaves) and intermediary devices (branches) to communicate with multiple base stations (roots).

Establishing the Wireless Network

As described in U.S. patent application Ser. No. 10/304,528, the contents of which are incorporated herein by reference, there is no connectivity among devices of a wireless network until at least one endpoint device initiates communication, e.g., by sending a hello message. This process is referred to here as "terminal-initiated polling". Communication may be initiated when an endpoint device, such as endpoint device 12, is first activated. That is, when endpoint device 12 is first activated, endpoint device 12 broadcasts a hello message to interrogate its surroundings. As used herein, the term "broadcast" means to send (or transmit) to one or more other network devices.

The hello message is a specialized data packet and is therefore also referred to as a "hello packet". The hello packet may contain information, such as the identity of an endpoint device and a request to enter the wireless network. All intermediary devices (e.g., routers or repeaters) within the RF transmission range (typically 30 to 100 feet, but not limited to these values) of the endpoint device re-broadcast the hello packet to seek connections with base stations or other intermediary devices within their respective RF transmission ranges. The intermediary devices re-broadcast the hello packet until the hello packet reaches all of the base stations 24 to 26. This technique of propagating the hello packet through the network is referred to as "flooding" the network.

When a base station receives a hello packet, the base station responds by generating and broadcasting a confirmation packet. The confirmation packet is also propagated throughout the entire wireless network 10 by flooding the network. Eventually, the confirmation packet reaches the endpoint device that initiated the hello message. At this point, communication among the network nodes is possible.

Along the route that the confirmation packet takes through wireless network 10, intermediary devices keep track of which node sent them the confirmation packet, i.e., an immediately preceding network node along the route. Each intermediary device stores a pointer in memory that points to this node. The pointers enable the intermediary devices to identify neighboring nodes that can be used in transporting a data packet closer to a base station. These neighboring nodes are referred to as master nodes, or simply "masters". A master acts as a primary recipient of data from its dependent, or "slave", node.

One characteristic of flooding a communication network is that nodes in the network may receive multiple copies of a confirmation packet. Thus, an intermediary device may establish more than one pointer, each pointing to a sender that sent a copy of the confirmation packet. These senders of confirmation packet are designated as master nodes, resulting in single device having multiple masters in at least some cases. One advantage to a device having multiple masters is that the device has more than one route to forward data packets to the base stations, thus increasing overall network reliability.

When an endpoint device sends a data packet toward host computer 30 along a particular route, a confirmation packet is issued at every link from the receiving node to the sending node. With such node-to-node confirmation, end-to-end network confirmation is no longer needed, resulting in highly responsive network communication.

An example of the terminal-initiated polling process will now be described with respect to FIG. 1. Initially, there is no endpoint device active in FIG. 1. Thus, there is no connectivity among the intermediary devices and base stations of the network. When endpoint device 12 is activated, endpoint device 12 broadcasts a hello packet. Only those devices within RF transmission range of endpoint device 12, namely intermediary devices 15 and 16, are able to receive the hello packet in this embodiment.

Since no connectivity exists among intermediary devices and base stations initially, intermediary devices 15 and 16 are unable to respond to the hello packet. Instead, intermediary devices 15 and 16 re-broadcast the hello packet to obtain responses from their own neighbors within RF transmission range. The hello packet propagates through the network in this manner, eventually reaching each of base stations 24 to 26. The base stations are likely reached at different times.

Base stations 24 to 26 respond to the hello packet by flooding the wireless network with confirmation packets. These confirmation packets eventually reach endpoint device 12. During propagation, each node of the network stores relationships to other nodes on the network, thereby establishing connectivity between endpoint device 12, the intermediary devices, and the base stations.

A process for storing the relationships and establishing master nodes during propagation is as follows. Upon receiving a hello packet sent, e.g., by intermediary device 15, base station 24 generates and broadcasts a confirmation packet. Intermediary devices 15 and 17 receive this confirmation packet, since they are within the RF transmission range of base station 24. The confirmation packet includes an identification number of base station 24 and a distance field that indicates how many hops the sender of the confirmation packet is from base station 24. Confirmation packets sent by a base station have "0" in the distance field, since a base station is the sender.

When intermediary device 15 receives the confirmation packet from base station 24, intermediary device 15 increments the distance field of the confirmation packet by "1", storing the resultant distance (in this case "1") in its cache, along with the identity (e.g., the network identifier (ID)) of base station 24. This distance is the number of hops from the intermediary device to base station 24. Intermediary device 15 also designates the sender, in this case base station 24, as its master node. Intermediary device 15 stores data in its cache indicating that base station 24 is its master node.

Before an intermediary device acknowledges a confirmation packet, the intermediary device must first broadcast a hello packet. This allows every intermediary device to explore its neighborhood (e.g., its RF transmission range) in order to identify multiple (e.g., all) paths to host computer 30. Accordingly, if intermediary device 17 (for example) receives a confirmation packet from base station 24 before intermediary device 17 has had a chance to broadcast an initial hello packet, intermediary device 17 ignores the confirmation packet. In this case, intermediary device 17 broadcasts its own copy of the hello packet to base station 24.

Upon receiving the hello packet from intermediary device 17, base station 24 responds with another confirmation packet. Intermediary device 17 can then process this confirmation packet in the same manner as intermediary device 15 processed its confirmation packet from base station 24.

As noted, a master node is defined as a next-hop node to which a packet is to be forwarded for delivery to a base station. Intermediary devices 15 and 17 thus store pointers in their caches that point to base station 24 as their master node. In addition, intermediary devices 15 and 17 re-broadcast the confirmation packet to inform their neighbors of their connectivity with, and their distances to, base station 24. This propagation process continues until every intermediary device in wireless network 10 has broadcasted a hello packet and received a confirmation packet.

As was the case with base station 24, base station 25 also receives hello packets from its neighboring intermediary devices, and broadcasts confirmation packets in response. Upon receiving a confirmation packet from base station 25, intermediary device 17 increments the distance field in the confirmation packet and recognizes base station 25 as another master. As noted, the multiple master configuration is particularly advantageous in an ad-hoc wireless network, since an RF link between any two nodes can be easily interfered with and/or fail. The multiple master configuration also provides a node with more than one path for forwarding a data packet to its destination.

Figure 2:
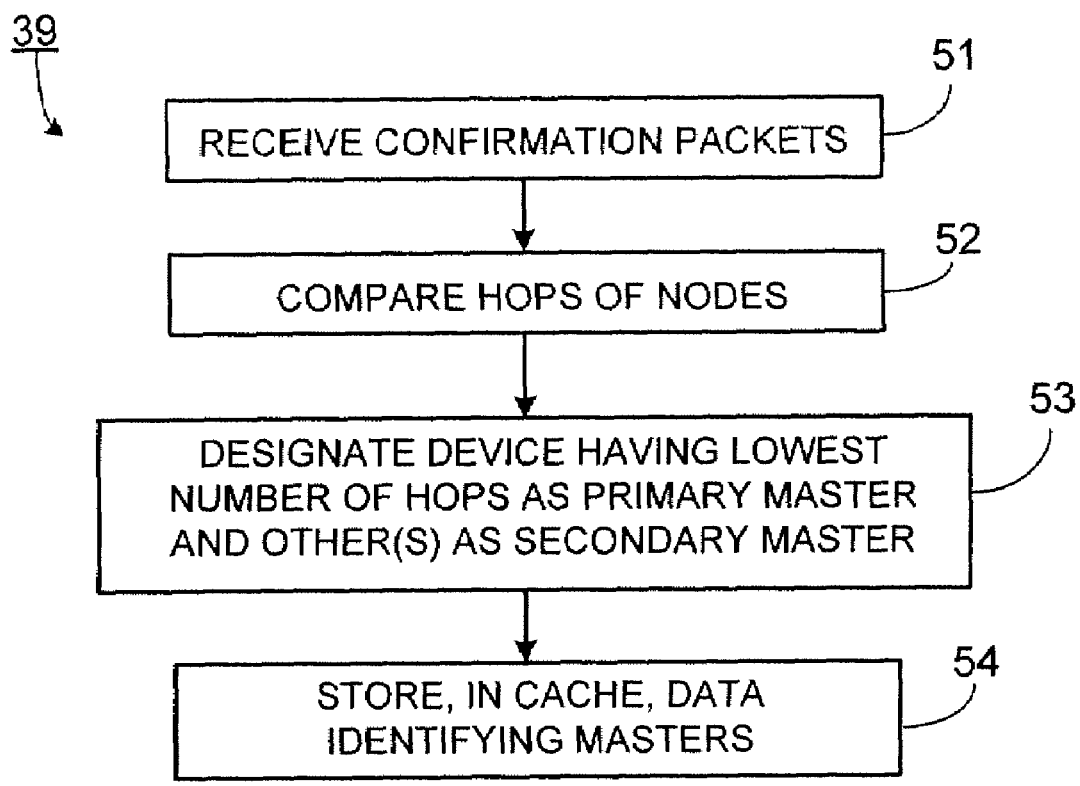
FIG. 2 is a flowchart of a process to route data through the wireless network.

Referring to FIG. 2, in process 39 the confirmation packet reaches endpoint device 12 via intermediary device 15. Once endpoint device 12 receives (51) the confirmation packet, endpoint device 12 recognizes intermediary device 15 as its master. Since endpoint device 12 is located within the transmission range of intermediary device 16, endpoint device 12 also receives (51) the confirmation packet from intermediary device 16. Endpoint device 12 thus also recognizes intermediary device 16 as its master.

After receiving confirmation packets from intermediary devices 15 and 16, endpoint device 12 compares (52) the distance fields of the two confirmation packets. Endpoint device 12 designates (53) intermediary device 15 to be its primary master, since intermediary device 15 is closer to any base station (in this case, to base station 24) than intermediary device 16. Endpoint device 12 designates (53) intermediary device 16 as its secondary master. In embodiments described below, other criteria are also taken into account when selecting a primary (secondary, etc.) master node.

If endpoint device 12 later determines that the RF link to intermediary device 15 is not reliable and/or often needs re-transmission, endpoint device 12 may designate intermediary device 16 as its primary master if intermediary device 16 provides a better link. Pointers to intermediary devices 15 and 16 are stored (54) in memory on endpoint device 12, together with data indicating their status as primary and secondary masters.

It is noted that endpoint device 12 may designate more than two intermediary devices (or base stations, as the case may be) as its masters. For example, one intermediary device may be designated as primary master, another as secondary master, another as tertiary master, and so on.

Master nodes store data for transmission to their "slave" nodes. For example, intermediary devices 15 and 16 store data destined for endpoint device 12 while endpoint device 12 is in low-power mode. When endpoint device 12 "awakens" (following a low-power mode period), endpoint device 12 may send a "heartbeat" packet to intermediary devices 15 and 16 (a heartbeat packet is a special packet transmitted on a periodic basis to maintain connectivity between a node and its master). In response to this heartbeat packet, intermediary devices 15 and 16 transmit the stored data to endpoint device 12.

It is noted that when a target intermediary device receives multiple confirmation packets from its neighboring intermediary devices, the target intermediary device also compares the distance fields of those confirmation packets and designates one network device as its primary master and other(s) as secondary master(s). For instance, intermediary device 21 may receive confirmation packets from intermediary device 20 and base station 26. In the packet sent by intermediary device 20, the distance field is "1", since intermediary device 20 is one hop away from base station 25. However, the distance field in the packet sent by base station 26 is "0". Therefore, intermediary device 21 designates base station 26 as its primary master and intermediary device 20 as its secondary master. During subsequent data transmission, if the RF link between intermediary device 21 and base station 26 becomes unreliable, intermediary device 21 may designate intermediary device 20 as its primary master, in the process demoting intermediary device 20 to secondary master status.

As noted, formation of wireless network 10 is initiated by a single endpoint device sending a hello packet. After the network is formed, data is routed between endpoint devices and the host computer collectively by all intermediary devices using a distributed routing process.

Starting from the source of the data packet, a node selects its primary master as the next-hop node. After every transmission from one node to another node (a hop), the receiving node immediately issues a confirmation packet (i.e., an acknowledgement or "ack") back to the sender. If no confirmation reaches the sender after a certain amount of time, the sender will re-transmit the same data packet. After several attempts at re-transmission without success, the sender will select an alternative master, if it exists in the sender's cache, as the next-hop node. With node-to-node confirmation and multiple choices of next-hop node, any broken or unreliable link can be quickly detected, and an alternative route can be established quickly, resulting in a reliable and responsive routing process. If for any reason that no alternative route can be established, the sender will transmit a hello packet to start a new search for at least one master node that can carry the packet closer to a base station. This local route-repair capability increases the reliability of delivering the packet to a base station even when any one of the intermediary devices between the source and destination loses connection with all master nodes that it recognizes.

Briefly, when a new endpoint device, such as endpoint device 14, wants to join wireless network 10, in one embodiment endpoint device 14 issues a hello packet. The hello packet from endpoint device 14 reaches intermediary devices 19 and 21. Since these two intermediary devices have already established routes to base stations, each of intermediary devices 19 and 21 responds to endpoint device 14 with a confirmation packet. Endpoint device 14 compares the distance fields of the two confirmation packets and designates intermediary device 21 as its primary master, since intermediary device 21 is only one hop away from base station 26. Intermediary device 19 is designated secondary master. Entry of a device into network 10 is described below in more detail below in the "Joining The Wireless Network" section.

One advantage of terminal-initiated polling is that an endpoint device need not wait to join a wireless network. That is, since the endpoint device initiates entry into the wireless network, the endpoint device controls when to establish a presence in the wireless network. The endpoint device is not required to wait for a periodic beacon signal from a base station before joining the wireless network.

Joining the Wireless Network

The wireless protocol forms a heterogeneous network without a rigidly prescribed hierarchy. In particular, every node in wireless network 10 can assume the role of an endpoint device or an intermediary device and can change dynamically based on criteria specified by a user. Essentially, the wireless protocol takes advantage of the flexibility of homogeneous networks and the power efficiency of heterogeneous networks. The wireless protocol's process for joining wireless network 10 is described with respect to FIG. 3.

Figure 3:
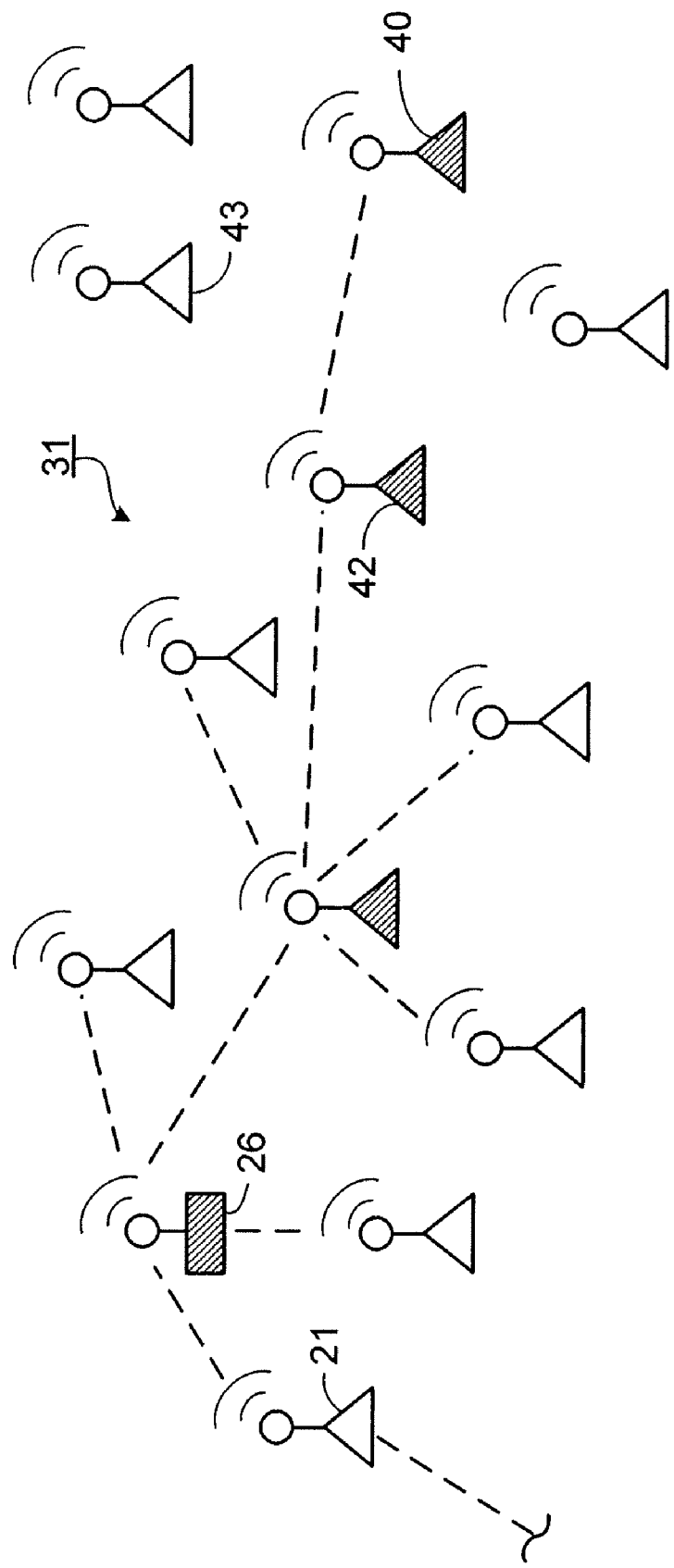
FIG. 3 is a block diagram of a portion of the wireless network of FIG. 1.

FIG. 3 shows a wireless network 31, which may be part of wireless network 10. When a target device, such as node 40 in FIG. 3, is activated for the first time and wants to join network 31, node 40 attempts to locate a packet forwarding device, such as an intermediary device or base station, in its neighborhood. In one embodiment, the network neighborhood comprises all devices to which node 40 has a direct RF link; although this application is not limited to this definition of "neighborhood". Node 40 does this in the manner described above, i.e., by sending out a hello packet. If node 40 finds, e.g., one or more intermediary devices within its network neighborhood (meaning that node 40 can establish an RF link to such a device), node 40 selects an intermediary device that satisfies predefined criteria, and designates that device as its primary master (and others as secondary, tertiary, etc. masters, if applicable). Node 40 then joins the network as an endpoint device with a low duty cycle. The same process occurs if node 40 identifies a base station in its neighborhood.

Criteria for selecting the primary master may include, but are not limited to, the distance to a base station (or gateway), the quality of the communication link to the intermediary device, and the battery capacity of the intermediary device. For example, node 40 may select a primary master node having less than a certain number of hops to a base station or endpoint device, as described above. In addition, in this embodiment, node 40 may select the primary master based also (or solely) on other criteria. For example, node 40 may select a node having a link with low amounts of noise, and/or having a large battery capacity (thereby ensuring more reliable operation of the primary master).

If node 40 cannot find any intermediary device (or base station) in its network neighborhood, node 40 will start operating as an intermediary device (e.g., a router). Computer code programmed into node 40 initiates its operation as a router, which includes forwarding data packets, maintaining routing information, and rarely (if ever) entering a low-power mode, among other things. During its operation as a router, node 40 "listens to" transmissions from neighboring devices, such as node 43. Node 43, in this case, is an endpoint device, since it is not an intermediary device or a base station (if it were an intermediary device or base station, node 40 would have recognized it as such in response to node 40's initial attempt at entry into the network). Node 40 "listens for" data transmissions from node 43, not search packet transmissions. This is because transmission of a search packet implies that node 43 is looking for connection to network 10. A data transmission, on the other hand, implies that node 43 is already connected to network 10.

After node 40 detects a data transmission from node 43, node 40 attempts to determine if node 43 is connected to network 10. To do this, node 40 may listen for re-transmission of the same data packet. Re-transmission of the same data packet implies that node 43 is not connected to the network. Node 40 may listen for an acknowledgement (or "ack") packet in response to the original transmission. The acknowledgement packet is sent by another node (e.g., node 42) that is on the network. This may not always work, however, because node 40 may be unable to receive the acknowledgement packet due, e.g., to a distance from a node transmitting the acknowledgement packet. Node 40 may send a packet to node 43 to determine its connectivity. This packet may advise node 43 of the existence of node 40, and ask node 43 whether node 43 is connected to the network.

Assuming that node 40 is able to confirm that node 43 is connected to the network, node 40 may send a data packet to node 43 asking node 43 (which, as noted above, is an endpoint device) to reconfigure itself as a router for node 40. Node 43 decides whether to configure itself as a router based, e.g., on its capabilities, available bandwidth, network access, and the like. Assuming that node 43 configures itself as a router, node 40 then reconfigures itself to be an endpoint device that routes communications through node 43. Node 40 selects node 43 to be its own primary master node.

If node 43 is not connected to the network, and no other nodes are available to act as a router for node 40, after a period of time node 40 may configure itself as an endpoint device. More specifically, one feature that distinguishes a router from an endpoint device is the endpoint device's ability to enter a low-power ("sleep") mode periodically. This allows the endpoint device to conserve power. In this embodiment, a router is usually unable to enter this low-power mode, since the router should be available to receive and forward data packets within the network. So, when node 40 configures itself as an endpoint device, node 40 is able to enter the sleep mode and conserve power. This feature is particularly advantageous for devices that run off-of limited power supplies, such as batteries.

Node 40 may be programmed to reconfigure itself as an endpoint device after operating as a router for a predetermined amount of time, e.g., one hour, or more or less than one hour. Any time period may be used. Once programmed as an endpoint device, node 40 may enter the low-power mode periodically. Upon exiting ("awakening") from the low-power mode, node 40 may again try to establish a connection to the network as an endpoint device, as described above. If that is not successful, node 40 may try to establish a connection to the network as a router in the manner described above, i.e., by configuring itself as a router, listening for non-search packet transmissions, etc.

The amount of time that node 40 remains configured as a router may be programmed into node 40. Alternatively, this amount of time may be dictated by network traffic (e.g., search packets) in the vicinity of node 40. For example, a large number of search packets (e.g., hello packets) detected in the vicinity of node 40 indicates that there are devices in the neighborhood (which, perhaps, are just not yet connected to the network). By contrast, few search packets detected in the vicinity of node 40 indicates that there may be few devices in the neighborhood (and, perhaps, node 40 is isolated). Thus, if a large number of data packets are detected in the vicinity of node 40, node 40 configures itself as a router for a longer period of time (since more devices implies a higher probability of achieving a network connection). By contrast, if few data packets are detected in the vicinity of node 40, node 40 configures itself as an endpoint device that can enter low-power mode for a relatively long period of time. In this case, node 40 "awakens" from the low-power mode less frequently, since there is less of a chance of achieving a network connection.

Node 40 may operate as an intermediary node for one or more other devices on network 31. Assuming that node 40 has a link to a master intermediary device, node 40 may decide whether to remain an intermediary device for neighboring endpoint devices. From the intermediary device IDs (identifiers) reported by neighboring endpoint devices, node 40 can identify whether any one of the neighboring endpoint devices relies on node 40 as its only intermediary device. For example, node 40 can query other intermediary devices for routing information. If at least one device does rely solely on node 40, then node 40 remains an intermediary device; otherwise node 40 configures itself as an endpoint device. This enables node 40 to conserve power by entering low-power mode.

If node 40 does not receive data or an intermediary device request from its neighboring nodes (endpoint devices or intermediary devices) for a predefined amount of time, node 40 may configure itself as endpoint device. The predefined time can be programmed into the device or selected based on one or more parameters. One example of such a parameter is the frequency with which a dependent endpoint device communicates with the intermediary device; i.e., the less frequent the communication from the endpoint device, the more often node 40 configures itself as an endpoint device.

When an intermediary device becomes a master intermediary device of a high number of nodes, a substantial amount of traffic can flow into the intermediary device. This can result in data congestion and, possibly, frequent data packet collision. Excessive traffic can be diverted for an overloaded intermediary device by obtaining a new intermediary device from endpoint devices in the neighborhood. In this situation, an intermediary device can issue and broadcast a router election request to its neighboring endpoint devices. Upon receiving this router election request, an endpoint device responds with a message indicating its operating status, which may include the ID of intermediary devices that it communicates with, its data generation rate, its remaining battery charge, etc.

After receiving responses from all neighboring endpoint devices, the intermediary device selects a new intermediary device based on a certain criteria. For example, an endpoint device that communicates with the most number of intermediary devices can offer higher connectivity with the rest of the network; an endpoint device with a relatively low data generation rate can offer more bandwidth to route data for other nodes; and an endpoint device with the most battery charge can afford to operate with a high duty cycle. The intermediary device instructs the selected node to configure itself as a router. One purpose of instructing one of the neighboring endpoint devices to be a router is to divert traffic. Once a new router is elected, the intermediary device need not select this new router as its own primary master. The overloaded intermediary device elects a new router simply to increase the number of intermediary devices in the neighborhood, so that traffic congestion through the overloaded intermediary device can be alleviated.

Every node in the network may continually search for a better primary master intermediary device in the manner described above. In most cases, a node can have one or multiple alternative masters in addition to its primary master. As such a new primary master can be selected from the alternative masters. However, there are situations where a node may find that all its master intermediary devices are unreliable. In this case, a node can broadcast a router election request to its neighboring nodes. Upon receiving the router election request, a neighboring node, either an endpoint device, an intermediary device or a base station, will respond with its operating status. After reviewing all responses, the requesting node selects a new primary master from the neighboring nodes. If the selected node is already an intermediary device, it is simply recognized as the new primary master of the requesting node. If the node is an endpoint device, the requesting node issues a message to request the endpoint device to become an intermediary device as well as the primary master of the requesting node. The endpoint device decides whether to become an intermediary device based, e.g., on its capabilities and connection to the network. If it does become an intermediary device, the endpoint device notifies the requesting node.

In the wireless protocol, every node seeks to operate as an endpoint device. A node will serve as an intermediary device when the node recognizes that either there is no intermediary device available in its neighborhood, or all neighboring intermediary devices cannot provide reliable connectivity due, e.g., to excessive traffic or radio link issues.

Ultimately, the wireless protocol leads to electing a relatively small number of intermediary device nodes based on predefined criteria needed to maintain network connectivity. The criteria can include, but are not limited to, one or more of the factors mentioned above, such as a number of hops to a base station, a reliability of the communication link, and remaining battery life. The probability of an endpoint device becoming an intermediary device node can be adjusted by tuning these factors. These factors may be tuned, e.g., via host computer 30 and/or by directly accessing the appropriate network device and programming the appropriate values.

Peer-to-Peer Packet Transmission

In the embodiment described above, data packets are routed through master nodes to whichever base station meets one or more predefined criteria. In this embodiment of the wireless protocol, data packets can be routed to a specific base station or endpoint device. In this embodiment, data packets may be routed to addresses of devices specified in packet headers. Such an address may represent a base station, an endpoint device, or an intermediary device. To implement data transmission to an endpoint device, a base station may send a data packet to the endpoint device instructing the endpoint device to configure itself as a base station. What this means is that the base station becomes a designated destination for data packets. The endpoint device responds with an acknowledgement ("ack") packet if it is willing to become an endpoint device. When the original base station receives the "ack" packet, that base station sends the packet to the endpoint device (now configured to operate as a base station). Nodes in the neighborhood of the endpoint device register the identity of the endpoint device as a new base station, allowing those nodes and various intermediary nodes to transmit data packets directly to the new base station in the manner described above in the section entitled "Establishing The Wireless Network".

An endpoint device (or an intermediary device) becomes a base station in order to receive data packets for the following reason. Data packets can be forwarded to an endpoint or an intermediary device; however, unlike delivering data packets to a base station, there is no local route repair capability when delivering data packets to an endpoint or an intermediary device. For example, if, for any reason, a data packet destined for an endpoint or an intermediary device cannot be sent by an intermediary device to any of its next-hop nodes, the data packet will be dropped by the intermediary device after several attempts, without sending hello packets to search for new routes to the destination endpoint or intermediary device. (It is noted that, in this case, a next-hop node is not a master node since a master node is defined as a network node that can carry data packets closer to a base station, not an endpoint or an intermediary device). By contrast, when delivering a data packet to a base station, if the data packet cannot be sent by an intermediary device to any of its next-hop nodes, an intermediary device will send hello packets to search for new routes to the base station.

This embodiment of the wireless protocol follows the same processes described above for establishing master nodes. However, here, each node in the network keeps track of routes to every one of the base stations that it has communicated with or received routing information for, i.e., base stations that the node has recognized. Nodes that communicate directly with base stations without intermediary devices register each of the base stations as a distinctive target destination, not as a replaceable master node. For base stations for which a node does not have routing information, the node will send out a search packet to a specific base station when it has packets for the specific base station or, in the case of a router, when it receives a search (e.g., a hello) packet from another node.

Using the wireless protocol, one base station can communicate with any other base station bi-directionally, and therefore, among base stations, peer-to-peer routing can be achieved. With this capability, when a base station needs to deliver packets reliably to an endpoint or a router, this base station can first send a packet to request the target endpoint or router to become a base station, and when the target endpoint or router receives the request packet, it will reconfigure itself into a base station, making that device ready to respond to any search packet looking for this new base station. The ability to respond to a search packet allows a node to be recognized as a base station to which data packets can be delivered reliably from other nodes on the network.

Base Station

A base station of network 10, such as base station 26, can configure itself to function as a router. A base station uses significant network resources, such as bandwidth, and, in many cases, requires a relatively large amount of power. Configuring the base station as a router reduces the base station's use of network resources and power.

Network 10 contains multiple (three) base stations in order to accommodate large amounts of network traffic. When less traffic is detected, there is less of a need for all three base stations. By way of example, base station 26 detects network traffic routed to it over a predetermined period of time. If less than a predetermined amount of network traffic is detected, base station 26 becomes a candidate for operation as a router.

Before base station 26 can operate as a router, base station 26 confirms that it is connected to network 10 other than through high-speed backbone 29. This is because, when base station 26 operates as a router, base station 26 will effectively disconnect itself from high-speed backbone 29. If base station 26 is not otherwise connected to network 10, endpoint devices connected to network 10 only through base station 26 will no longer be connected to network 10. Therefore, before configuring itself as a router, base station 26 verifies that it is connected to network 10 through means other than high-speed backbone 29. Base station 26 does this by sending a data packet to a neighboring intermediary device that is not on backbone 29, such as device 22, and receiving a response packet from that device. Once base station 26 determines that it is connected to network 10 other than through high speed backbone 29, base station 26 configures itself as a router.

Base station 26 may periodically check whether to reconfigure itself to operate as a base station (i.e., reconfigure itself from its operation as a router). Base station does this by periodically monitoring network traffic going through base station 26. If the amount of traffic exceeds a predetermined amount (which may be programmed into base station 26 in advance), base station 26 reconfigures itself to perform the functions of a base station. What this means is that base station 26 no longer acts as a router by forwarding data packets into the network (e.g., to intermediary device 22). Instead, base station 26 forwards data packets that it receives to host computer 30 via high-speed backbone 29.

Figure 4:
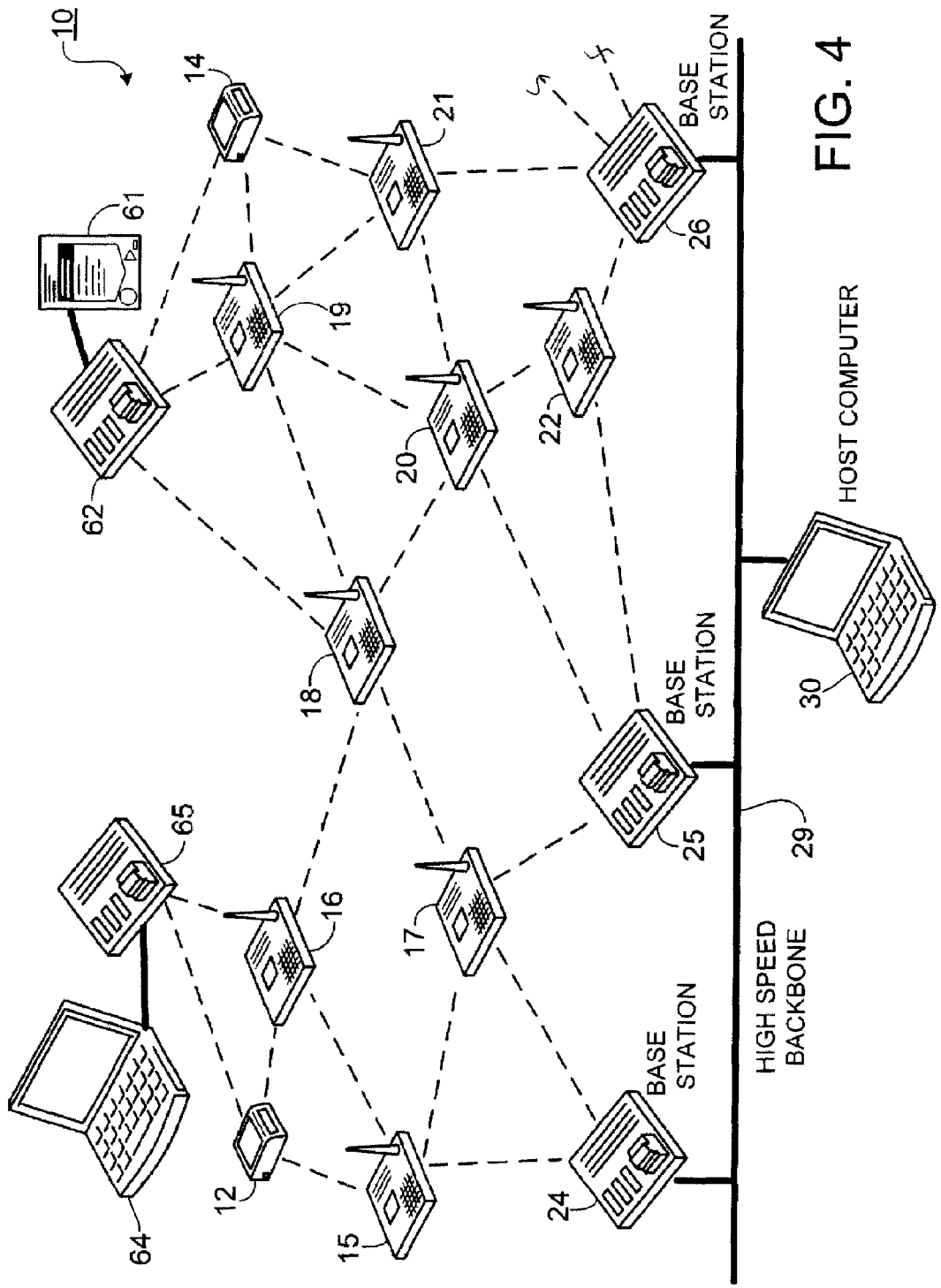
FIG. 4 is a block diagram of the wireless network of FIG. 1, which includes additional base stations that are mobile.

As shown in FIG. 4, base stations may be incorporated into network 10 that are not connected to high-speed backbone 29. These "mobile" base stations may be connected to mobile devices, such as a personal digital assistant (PDA) 61 (base station 62) or laptop computer 64 (base station 65). The mobile base stations, PDA 61 and/or laptop computer 64 may be connected to the host computer 30 via a Wi-Fi connection. Wi-Fi is short for "wireless fidelity" and is used to refer to any type of 802.11 network, whether 802.11b, 802.11a, dual-band, etc.

The mobile base stations operate in the same manner as described above. For example, the mobile base stations may reconfigure themselves as routers if necessary. For example, a Wi-Fi connection to network 10 may become unreliable or "go down" altogether. In this case, the mobile base station, e.g., base station 65, may reconfigure itself as a router and then enter network 10, as described above. By reconfiguring the base station as a router, a device connected to the mobile base station (e.g., laptop computer 64 or PDA 61) can send data to, and receive data from, network 10 if its (Wi-Fi) link goes down. It is noted that if the mobile base station is required to receive data from network 10 reliably with local route-repair capability, the mobile base station can continue to operate as a base station.

Multiple networks may occupy the same physical space. Data packets for such networks are differentiated by a network group identifier (ID). Thus, the networks remain logically separate even though they occupy the same physical space. Such networks may even use the same devices, either in the same or in different roles. For example, device 24 may act as a router for one network and as a base station for another network; device 17 may operate as an endpoint device for one network and as a base station for another network, etc. Operation of devices in such different networks is as described herein. Devices may be programmed to operate as base stations, routers, or endpoint devices in one network by specifying the group ID of that network and the functionality of the device for that group ID. A host computer may initiate/control programming of the various devices or the devices may be programmed directly on the devices themselves.

In networks, such as network 10, all of the base stations are ultimately connected to host computer 30. In this case, data packets may be stored and organized by host computer 30. In networks such as these, host computer 30 maintains a central database comprised of packets from one or more endpoint devices. In other networks, the base stations are not all connected to the same host computer (e.g., laptop computer 64 or PDA 61 may act as host). In this type of network, different base stations may receive packets resulting from a single transmission of an endpoint device. Each base station maintains a separate database of packets that it receives. The various base stations synchronize their databases periodically. Synchronization may occur via wireless connection or via a wired connection, such as Ethernet (if a wired connection exists among the various databases). This synchronization results in each base station containing a complete database of all packets that reach base stations in the network. Redundant databases such as these are particularly advantageous because they provide back-up in the even of failure of a base station on the network.

Network Device

Figure 5A:
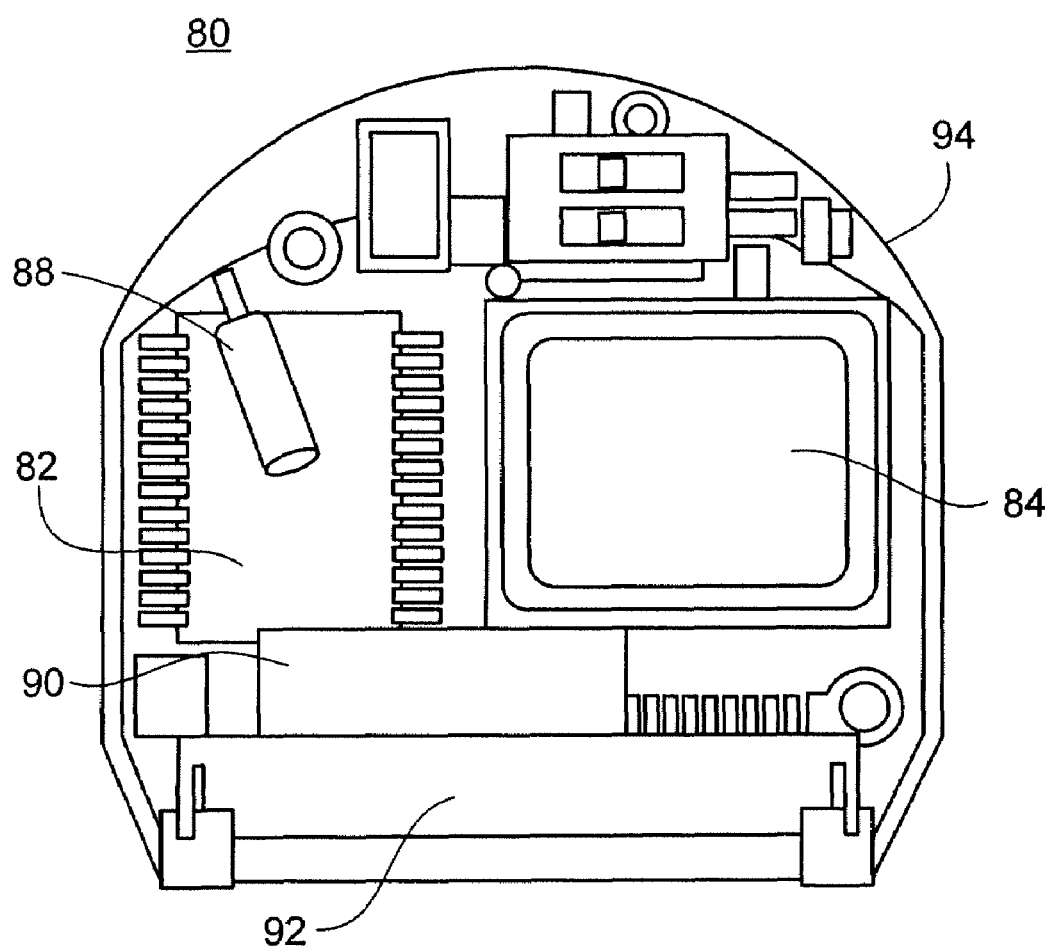
FIGS. 5A to 5C are cut-away views of a device that may implement the wireless protocol.
Figure 5B:
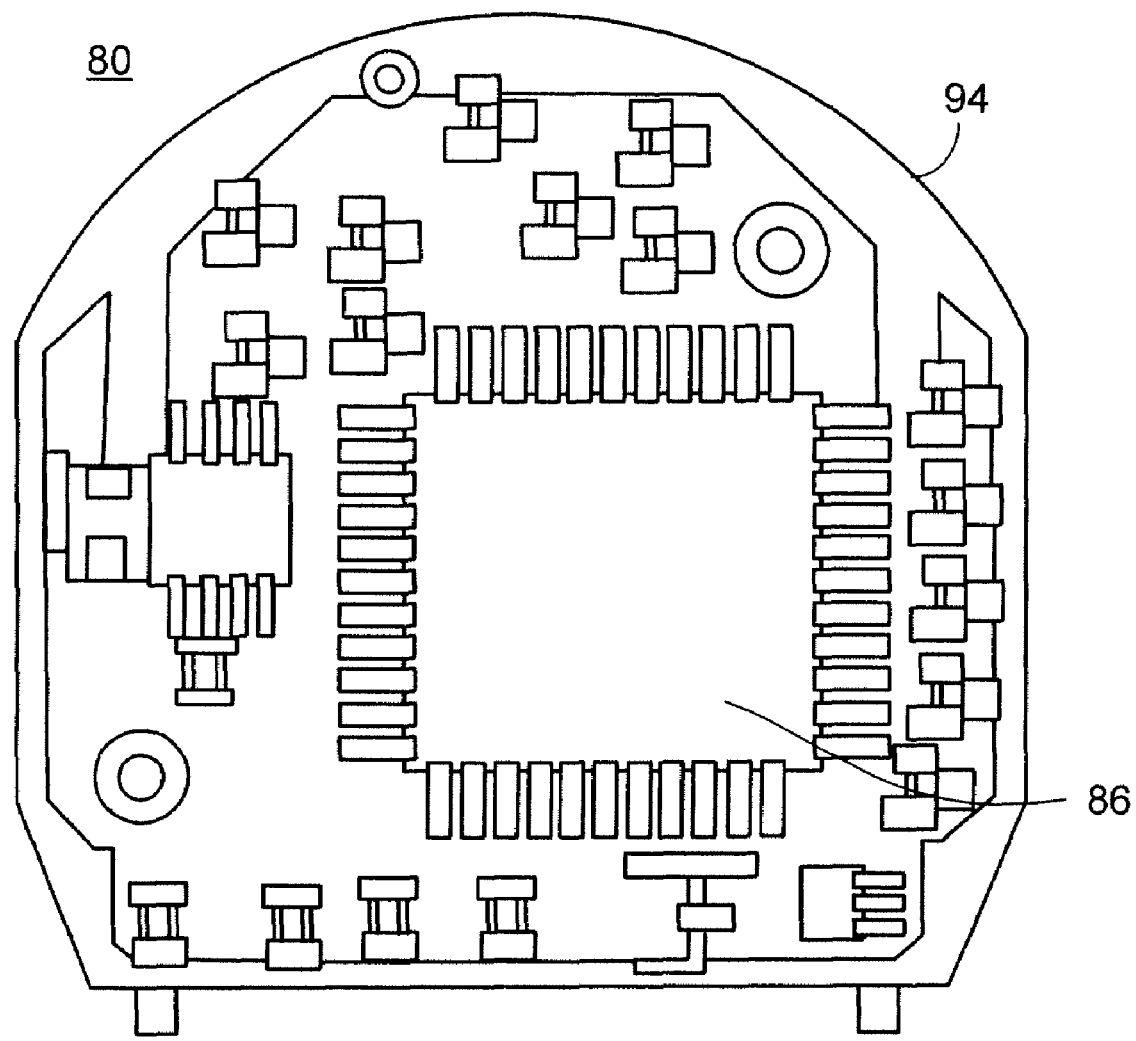
Figure 5C:
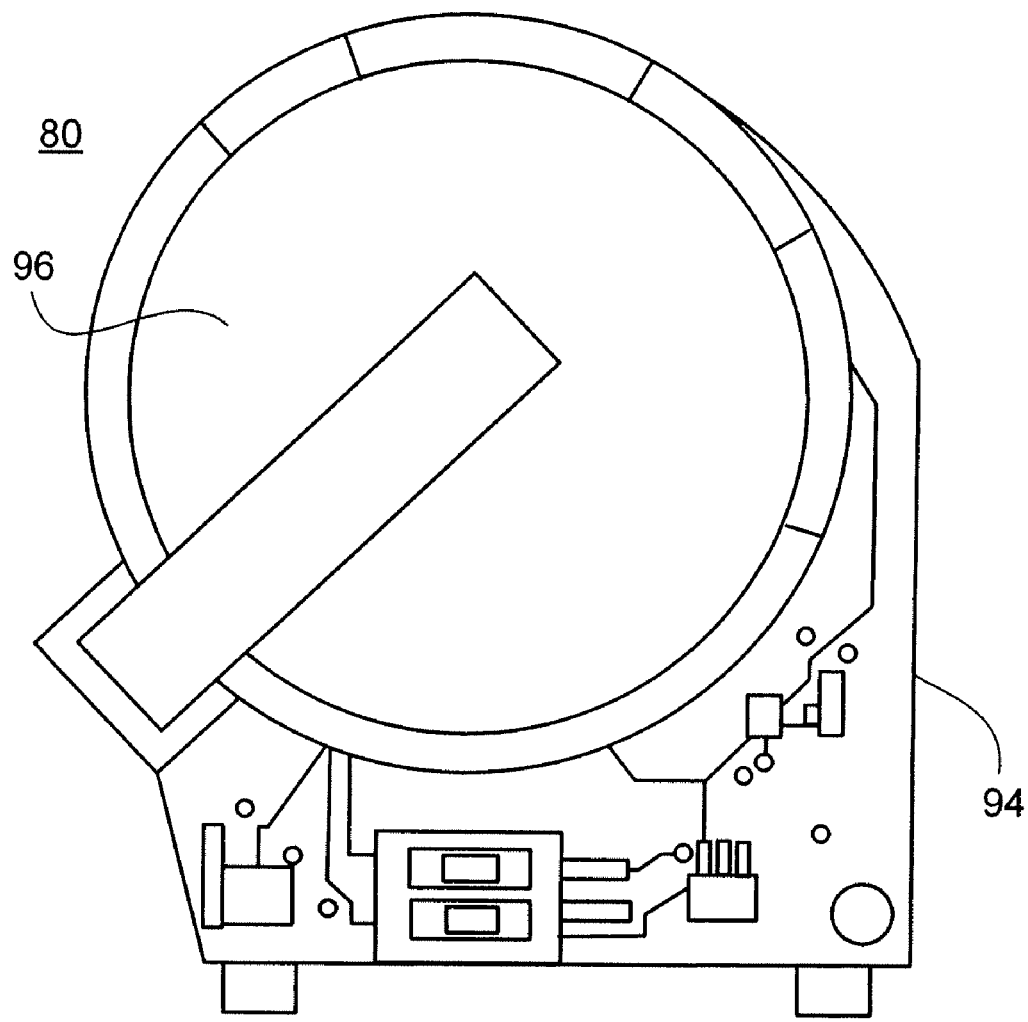

Examples of network devices that maybe used in wireless network 10, and that may implement the wireless protocol, are described in U.S. patent application Ser. No. 09/999,098, the contents of which are hereby incorporated by reference into this application as if set forth herein in full. FIGS. 5A to 5C show block diagrams of one example of a network device 80 that may implement the wireless protocol.

Network device 80 is a self-contained, miniaturized computer. As shown in FIGS. 5A and 5B, network device 80 includes first processing unit 82, RF transceiver 84, second processing unit 86, low clock frequency crystal 88, high clock frequency crystal 90, and I/O connector 92, all mounted on circuit board 94. As shown in FIG. 5C, a power source 96, such as a battery, may be attached to the back of circuit board 94. A memory containing instructions to be executed by each processing unit may be included inside each processing unit or one or more such memories (not shown) may be mounted on circuit board 94.

The small size and low power consumption of network device 80 allows network device 80 to operate from battery 90. In this embodiment, first processing unit 82 operates at a clock frequency of 32 kHz, and second processing unit 86 operates at a clock frequency of 4 MHz. A coordinating protocol operates so that network device 80 may perform signal processing and RF transmission with increased power efficiency.

The coordinating protocol is used to control the operation of network device 80 by assigning tasks and operations to the processing units based upon the speed required to perform a given task of function. The coordinating protocol is designed to assign tasks to the various processing units with the result being increased power efficiency on network device 12. For example, the coordinating protocol will allow CPU 82 to assign a given task or operation (such as joining or establishing a presence in wireless network 10) to itself or to CPU 86 based upon the speed requirements of the task or operation and the clock frequencies of the processing units. Tasks and operations which require lower clock frequencies will be assigned to CPU 86 with the lower clock frequency. Because CPU 86 operates at lower clock frequency, the power efficiency of the system as a whole is increased. When the task load of the system is low enough, the CPUs may be shut-off or placed into low-power mode to further increase the power efficiency of the system.

Other Embodiments

The wireless protocol described herein may find applicability in any computing or processing environment. The wireless protocol may be implemented using hardware, software, or a combination thereof. The wireless protocol is not limited to use with the hardware and software described herein; it may find applicability in any computing, processing or networking environment and with any type of machine that is capable of executing machine-readable instructions.

The wireless protocol may be implemented using digital electronic circuitry, or in computer hardware, firmware, software, or in combinations thereof. The wireless protocol can be implemented via a computer program product, i.e., a computer program tangibly embodied in an information carrier, e.g., in one or more machine-readable storage devices/media or in a propagated signal, for execution by, or to control the operation of, one or more data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the protocol can be performed by one or more programmable processors executing one or more computer programs to perform the functions of the wireless protocol. The method steps can also be performed by, and the wireless protocol can be implemented via, special purpose logic circuitry, e.g., one or more FPGAs (field programmable gate array) or ASICs (application-specific integrated circuit).

Processors suitable for execution of a computer program include, e.g., both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The wireless protocol can be implemented via a computing system that includes one or more back-end components, e.g., a data server, or that includes one or more middleware components, e.g., an application server, or that includes one or more front-end components, e.g., a client computer. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on respective computers and having a client-server relationship to each other.

The wireless protocol not limited to the embodiments described. For example, the wireless protocol can be used with network devices other than those shown in 5A to 5C. Any computer, router, server, wireless device, or similar machine may implement the wireless protocol. The wireless protocol can be used on homogeneous networks as well. The wireless protocol can be used with networks having configurations other than those shown in FIGS. 1 and 4. The wireless protocol is not limited to use with the protocols and data transmission methods described herein, but rather is universally adaptable.

The processing described herein may be performed in a different order and/or portions thereof may be omitted. As such, operations performed in furtherance of the wireless protocol are not limited to the flows described herein.

Elements of different embodiments may be combined to form another embodiment not specifically set forth above. Other embodiments not specifically described herein are also within the scope of the following claims.

What is claimed is:

1. A method of reconfiguring a base station on a wireless network, the base station being connected to a host computer via a wired connection, the method comprising:
   detecting an amount of traffic directed to the base station from other devices on the wireless network;
   determining whether the base station has at least one connection to the wireless network that is not via the wired connection;
   configuring the base station to act as an intermediary device on the network if the amount of traffic is below a predetermined amount and the base station has at least one connection to the wireless network that is not via the wired connection; and
   if the base station is not configured to act as an intermediary device, synchronizing a database of the base station with databases of other base stations on the wireless network.

2. The method of claim 1, wherein determining comprises:
   sending a data packet to a target device on the wireless network; and
   receiving a response to the data packet.

3. The method of claim 1, further comprising:
   checking the amount of traffic directed to the base station from other devices on the wireless network; and
   determining whether to reconfigure the base station to transmit data packets via the backbone connection if the amount of traffic exceeds a predetermined amount.

4. A method of reconfiguring a base station on a wireless network, the base station being connected to a host computer via a wired connection, the method comprising:
   detecting an amount of traffic directed to the base station from other devices on the wireless network;
   determining whether the base station has at least one connection to the wireless network that is not via the wired connection;
   configuring the base station to act as an intermediary device on the network if the amount of traffic is below a predetermined amount and the base station has at least one connection to the wireless network that is not via the wired connection, wherein configuring is performed for operation of the base station in a first logical network but not for operation of the base station in a second logical network.

5. A machine-readable medium comprising instructions that are executable on a base station on a wireless network, the base station being connected to a host computer via a wired connection, the instructions causing the base station to:
   detect an amount of traffic directed to the base station from other devices on the wireless network;
   determine whether the base station has at least one connection to the wireless network that is not via the wired connection; and
   configure the base station to act as an intermediary device on the network if the amount of traffic is below a predetermined amount and the base station has at least one connection to the wireless network that is not via the wired connection; and
   synchronize a database of the base station with databases of other base stations on the wireless network if the base station is not configured to act as an intermediary device.

6. The machine-readable medium of claim 5, wherein determining comprises:
   sending a data packet to a target device on the wireless network; and
   receiving a response to the data packet.

7. The machine-readable medium of claim 5, further comprising instructions that cause the base station to:
   check the amount of traffic directed to the base station from other devices on the wireless network; and
   determine whether to reconfigure the base station to transmit data packets via the backbone connection if the amount of traffic exceeds a predetermined amount.

8. A machine-readable medium comprising instructions that are executable on a base station on a wireless network, the base station being connected to a host computer via a wired connection, the instructions causing the base station to:
   detect an amount of traffic directed to the base station from other devices on the wireless network;
   determine whether the base station has at least one connection to the wireless network that is not via the wired connection; and
   configure the base station to act as an intermediary device on the network if the amount of traffic is below a predetermined amount and the base station has at least one connection to the wireless network that is not via the wired connection, wherein configuring is performed for operation of the base station in a first logical network but not for operation of the base station in a second logical network.

9. A base station on a wireless network, the base station also being connected to a high-speed data line, the base station comprising:
   memory that stores instructions; and
   one or more processing devices that execute the instructions to:
      detect an amount of traffic directed to the base from other devices on the wireless network;
      determine whether the base station has at least one connection to the wireless network that is not via the wired connection;
      configure the base station to act as an intermediary device on the network if the amount of traffic is below a predetermined amount and the base station has at least one connection to the wireless network that is not via the wired connection; and synchronize a database of the base station with databases of other base stations on the wireless network if the base station is not configured to act as an intermediary device.

10. The base station of claim 9, wherein determining comprises:
sending a data packet to a target device on the wireless network; and
receiving a response to the data packet.

11. The base station of claim 9, wherein the one or more processing devices execute instructions to:
check the amount of traffic directed to the base station from other devices on the wireless network; and
determine whether to reconfigure the base station to transmit data packets via the high-speed data line if the amount of traffic exceeds a predetermined amount.

12. A base station on a wireless network, the base station also being connected to a high-speed data line, the base station comprising:
memory that stores instructions; and
one or more processing devices that execute the instructions to:
detect an amount of traffic directed to the base from other devices on the wireless network;
determine whether the base station has at least one connection to the wireless network that is not via the wired connection; and
configure the base station to act as an intermediary device on the network if the amount of traffic is below a predetermined amount and the base station has at least one connection to the wireless network that is not via the wired connection, wherein configuring is performed for operation of the base station in a first logical network but not for operation of the base station in a second logical network.

13. A method of reconfiguring a base station on a wireless network, the base station being connected to a backbone connection the method comprising:
detecting an amount of traffic directed to the base station from other devices on the wireless network;
determining whether the base station has at least one connection to the wireless network that is not via the backbone connection;
configuring the base station to act as an intermediary device on the network if the amount of traffic is below a predetermined amount and the base station has at least one connection to the wireless network that is not via the backbone connection, wherein configuring comprises programming the base station not to transmit data packets via the backbone connection; and
wherein, if the base station is not configured to act as an intermediary device, synchronizing a database of the base station with databases of other base stations on the wireless network.

14. A method of reconfiguring a base station on a wireless network, the base station being connected to a backbone connection the method comprising:
detecting an amount of traffic directed to the base station from other devices on the wireless network;
determining whether the base station has at least one connection to the wireless network that is not via the backbone connection; and
configuring the base station to act as an intermediary device on the network if the amount of traffic is below a predetermined amount and the base station has at least one connection to the wireless network that is not via the backbone connection, wherein configuring comprises programming the base station not to transmit data packets via the backbone connection. wherein configuring is performed for operation of the base station in a first logical network but not for operation of the base station in a second logical network.

15. A machine-readable medium comprising instructions that are executable on a base station on a wireless network, the base station being connected to a backbone connection, the instructions causing the base station to:
detect an amount of traffic directed to the base station from other devices on the wireless network;
determine whether the base station has at least one connection to the wireless network that is not via the backbone connection;
configure the base station to act as an intermediary device on the network if the amount of traffic is below a predetermined amount and the base station has at least one connection to the wireless network that is not via the backbone connection, wherein configuring comprises programming the base station not to transmit data packets via the backbone connection; and
synchronize a database of the base station with databases of other base stations on the wireless network if the base station is not configured to act as an intermediary device.

16. A machine-readable medium comprising instructions that are executable on a base station on a wireless network, the base station being connected to a backbone connection, the instructions causing the base station to:
detect an amount of traffic directed to the base station from other devices on the wireless network;
determine whether the base station has at least one connection to the wireless network that is not via the backbone connection; and
configure the base station to act as an intermediary device on the network if the amount of traffic is below a predetermined amount and the base station has at least one connection to the wireless network that is not via the backbone connection, wherein configuring comprises programming the base station not to transmit data packets via the backbone connection, wherein configuring is performed for operation of the base station in a first logical network but not for operation of the base station in a second logical network.

17. A base station on a wireless network, the base station also being connected to a high-speed data line, the base station comprising:
memory that stores instructions; and
one or more processing devices that execute the instructions to:
detect an amount of traffic directed to the base station from other devices on the wireless network;
determine whether the base station has at least one connection to the wireless network that is not via the high-speed data line;
configure the base station to act as an intermediary device on the wireless network if the amount of traffic is below a predetermined amount and the base station has at least one connection to the wireless network that is not via the high-speed data line, wherein configuring comprises programming the base station not to transmit data packets via the high-speed data line; and
synchronize a database of the base station with databases of other base stations on the wireless network if the base station is not configured to act as an intermediary device.

18. A base station on a wireless network, the base station also being connected to a high-speed data line, the base station comprising:
　memory that stores instructions; and
　one or more processing devices that execute the instructions to:
　　detect an amount of traffic directed to the base station from other devices on the wireless network;
　　determine whether the base station has at least one connection to the wireless network that is not via the high-speed data line; and
　　configure the base station to act as an intermediary device on the wireless network if the amount of traffic is below a predetermined amount and the base station has at least one connection to the wireless network that is not via the high-speed data line, wherein configuring comprises programming the base station not to transmit data packets via the high-speed data line, wherein configuring is performed for operation of the base station in a first logical network but not for operation of the base station in a second logical network.

* * * * *